United States Patent [19]
Omiya et al.

[11] 3,873,100
[45] Mar. 25, 1975

[54] RECORD DISK LOADING AND RETRIEVING SYSTEM

[75] Inventors: Shoji Omiya, Shijonawate; Toshio Yoshimatsu, Hirakata, both of Japan

[73] Assignee: Matsushita Electric Industrial Co., Ltd., Osaka, Japan

[22] Filed: July 27, 1973

[21] Appl. No.: 383,290

[30] Foreign Application Priority Data

| | | |
|---|---|---|
| July 31, 1972 | Japan | 47-77224 |
| Apr. 4, 1973 | Japan | 48-38906 |
| Oct. 2, 1972 | Japan | 47-99347 |
| Aug. 28, 1972 | Japan | 47-100575 [U] |
| Nov. 16, 1972 | Japan | 47-132455 [U] |
| Dec. 19, 1972 | Japan | 47-146217 [U] |
| Dec. 20, 1972 | Japan | 47-147156 [U] |
| Dec. 26, 1972 | Japan | 48-750 [U] |

[52] U.S. Cl. .......... 274/9 B
[51] Int. Cl. .......... G11b 3/00
[58] Field of Search .......... 274/9 B, 4 H; 214/314

[56] References Cited

UNITED STATES PATENTS

| | | | |
|---|---|---|---|
| 3,377,072 | 4/1968 | Fentilini | 274/9 B |
| 3,662,360 | 5/1972 | Lambert | 274/10 R |

*Primary Examiner*—Harry N. Haroian
*Attorney, Agent, or Firm*—Stevens, Davis, Miller & Mosher

[57] ABSTRACT

A record disk loading and retrieving system is provided in which when a record disk stored in a container is inserted, the record disk is taken out of the container, fixed on a turn table and reproduced by a simple structure, and when the reproduction is ended, a load is applied to the outer periphery of the record disk in a direction to damp the rotation so that the rotation of the record disk is transformed into a thrust in a radial direction by said rotation load so as to retrieve the record disk into the container. There is no need to stop or wait the cease of the rotation of the turn table, but the rotation of the record disk is utilized effectively.

10 Claims, 46 Drawing Figures

FIG. 28
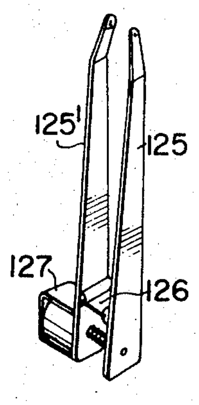
FIG. 29
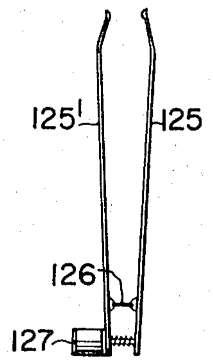
FIG. 30 FIG. 31
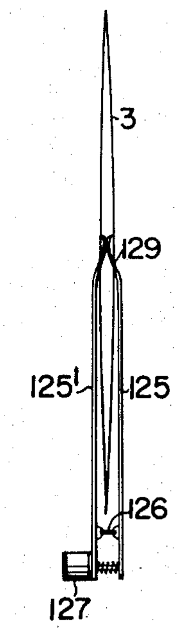
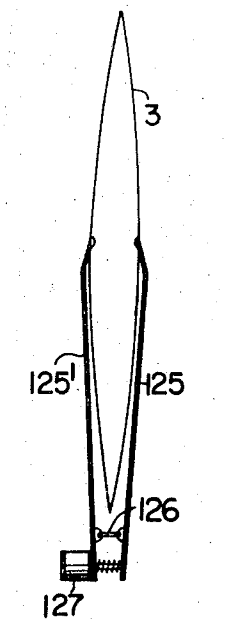
FIG. 32
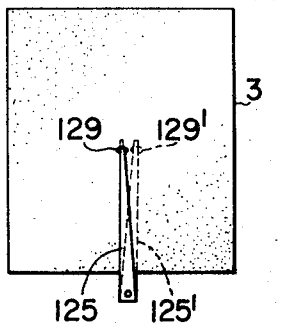

RECORD DISK LOADING AND RETRIEVING SYSTEM

This invention relates to a system for loading and retrieving a record disk and more particularly to a record disk loading and retrieving system between a container case and a turn table in a reproducing system.

Conventionally, in loading a record disk in a reproducing system, that record disk which is contained in a cartridge formed therefor is loaded in a reproducing system with said special cartridge and turned in the cartridge to reproduce the record, or alternatively a more usual record disk which is contained in a cheap jacket, etc. for the purpose of protection is taken out of the jacket and loaded in a reproducing system. These systems are, however, accompanied by drawbacks. Namely, in the former, since a record disk is rotated in a cartridge, the cartridge becomes very expensive for the purpose of protecting the record from possible damage and stably rotating the record and hence will have a large volume which is inconvenient for handling and storing. Therefore, such a special cartridge is not suitable for domestic use and can only have limited use. In the latter case, although a jacket, etc. can be made at a low cost, since the record disk will be directly handled, etc., it may be easily subjected to a damage or marked with finger prints so that the record condition deteriorates. Therefore, there has been proposed one method in which a record disk contained in a cheap jacket or cartridge, can be loaded in a reproducing system without taking off the jacket and then pulled out of the jacket or cartridge within the reproducing system. In retrieving a record disk having ended its reproduction according to this method, however, the record disk does not stop its rotation immediately and thus it is necessary to forcedly stop the rotation or to wait for the cessation of rotation for the retrieval. In the former case, a brake is required which makes the cost of the whole system higher and the structure of the whole system complicated. This may lead to an additional cause of malfunction. In the latter case, retrieval cannot be done until the rotation ceases and thereby the retrieval time becomes long. This is very disadvantageous in the case of the application to an auto-changer.

This invention intends to remove the above drawbacks.

An object of this invention is to provide a record disk loading and retrieving system in which a record disk contained in a container casing can be set in a loading and unloading unit, then the record disk is taken out of the container casing, set on a turn table and rotated to achieve reproduction, and the record disk having ended its reproduction is applied with a damping force at the periphery while its rotation continues so that the rotation of the record disk is transformed into a thrust motion in a radial direction by said dampling load and thereby works to store the record disk in the container casing.

According to an embodiment of this invention, there is provided a record disk loading and retrieving system comprising; a record disk, a record disk container having an opening on one side for allowing said record disk to be retrieved and replaced therein, a turn table for engaging with and rotating said record disk, means for taking said record disk out of said record disk container and transporting the disk onto said turn table, clamp means for detachably engaging said record disk with said turn table, means for contacting the periphery of said record disk rotating on said turn table and applying a damping load for the rotation when said clamp means is released, and guide means for guiding the record disk to the opening of said container utilizing the thrust force generated by the rotation of said record disk subjected to said load means.

According to the present invention, there are provided such advantages that a record disk can be prevented from being directly touched by hands, loading and retrieval of a record disk can be done automatically and rapidly, thereby high speed retrieval can be done without need for a complicated structure, high speed retrieval does not damage the record disk, and a cheap and simple disk container can be used.

Hereinbelow, description will be made more in detail in conjunction with the accompanying drawings.

Figure 2:
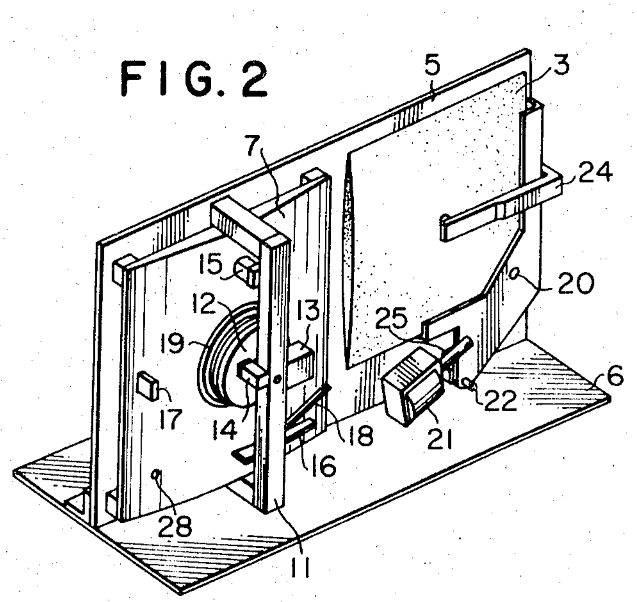
FIG. 2 is a perspective view of the main portions of the inner structure of the embodiment of this invention shown in FIG. 1.

FIGS. 3 to 8 and 3′ to 8′ are combinations of a plan view and a side view respectively, showing various operaional states of the structure shown in FIG. 2.

Figure 9:
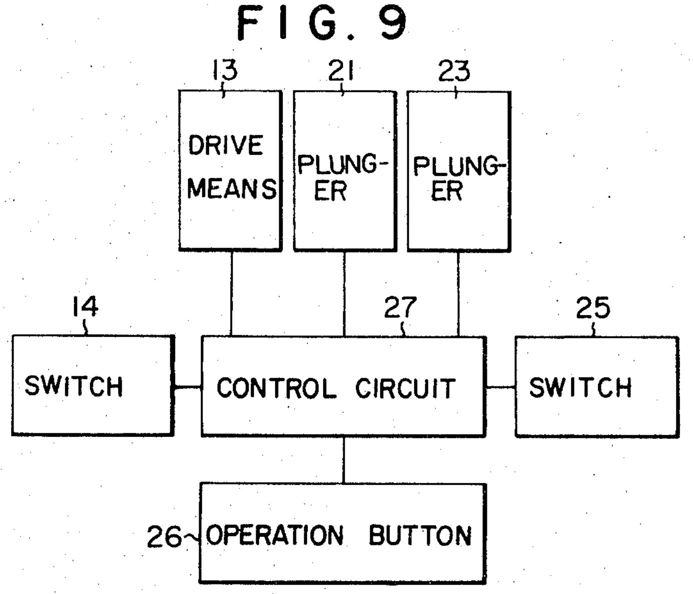

FIG. 9 is a block diagram of an electrical connection for controlling and driving the structure of FIG. 2.

Figure 10:
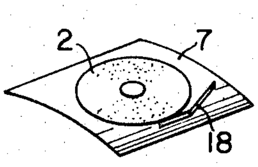
Figure 11:
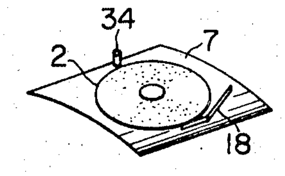
Figure 12:
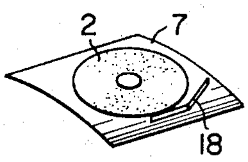

FIGS. 10 to 12 show the manner how record disk is brought into contact with a guide member in such a system as shown in FIGS. 4 to 8, wherein the rotation plane of the record disk is needed to be held in a horizontal plane.

Figure 13:
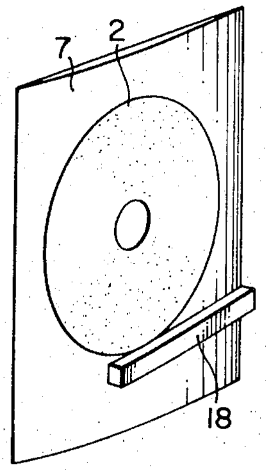
Figure 14:
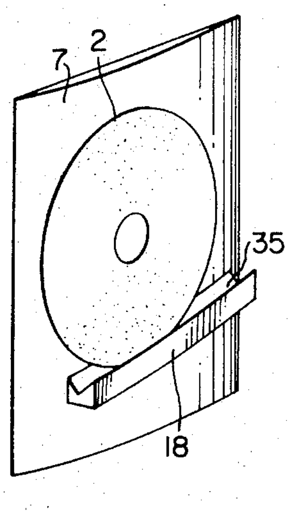
Figure 15:
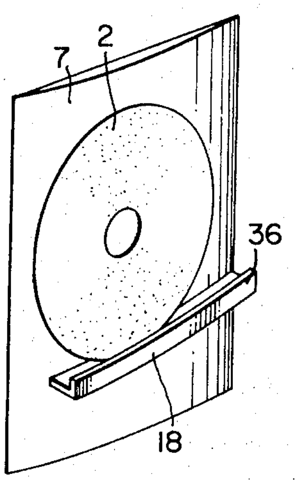

FIGS. 13 to 15 show examples of the guide member to be used in the present system.

Figure 16:
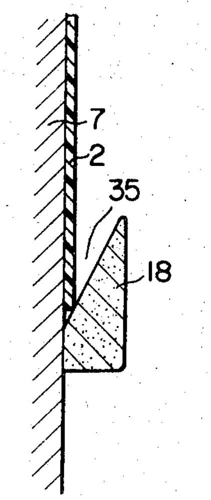
Figure 17:
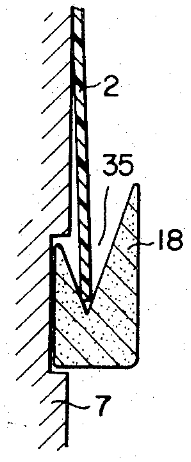

FIGS. 16 and 17 show other examples of the guide member to be used in the present system.

Figure 18:
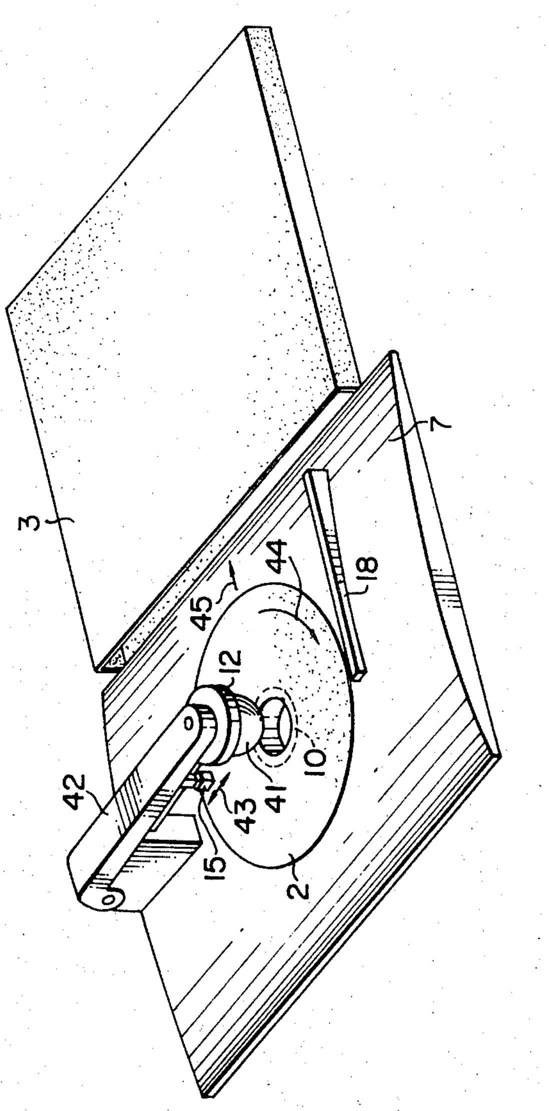
Figure 19A:
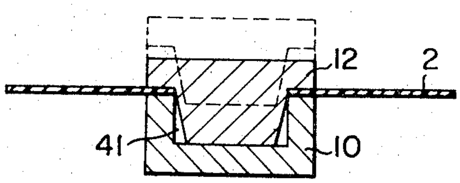
Figure 19B:
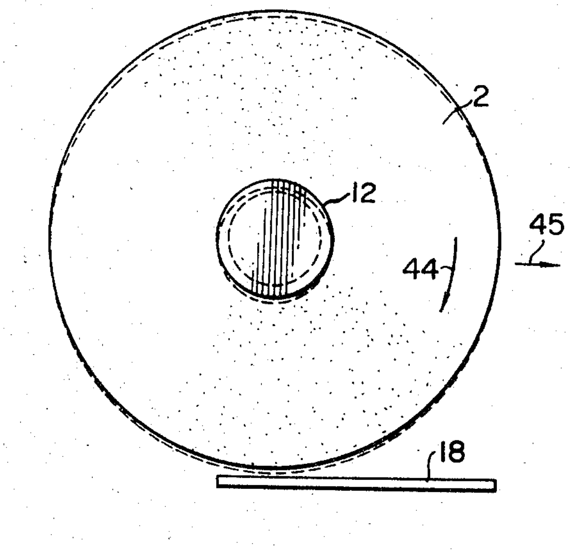

FIGS. 18, 19*a* and 19*b* show the relation of a clamp mechanism and a record disk in an embodiment of the invention.

Figure 20:
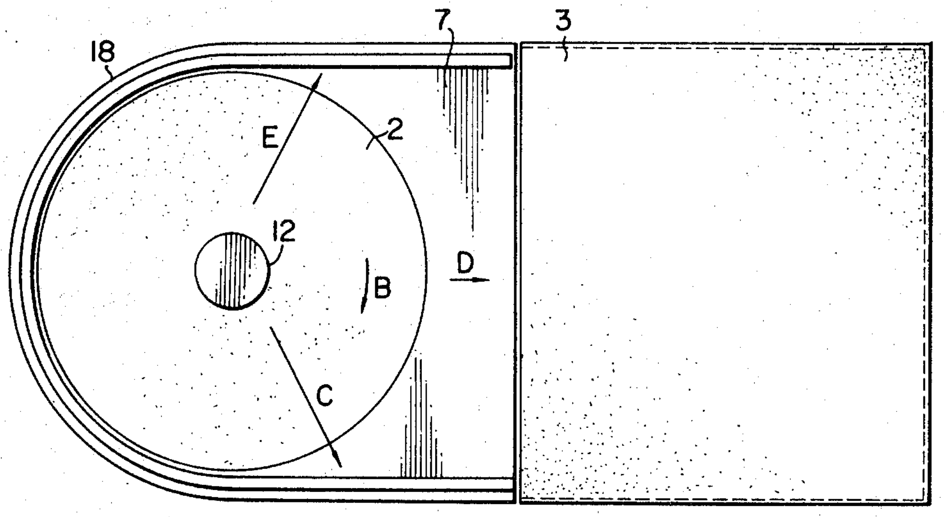
Figure 21:
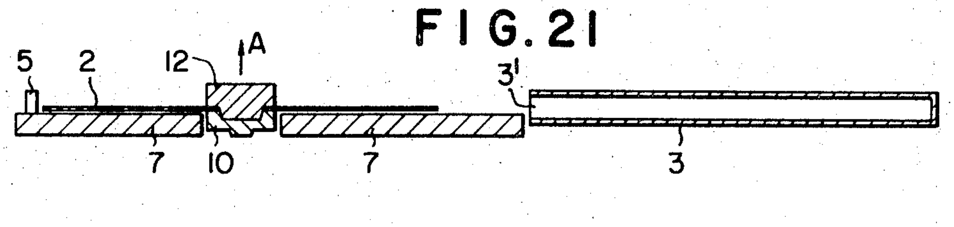
Figure 22:
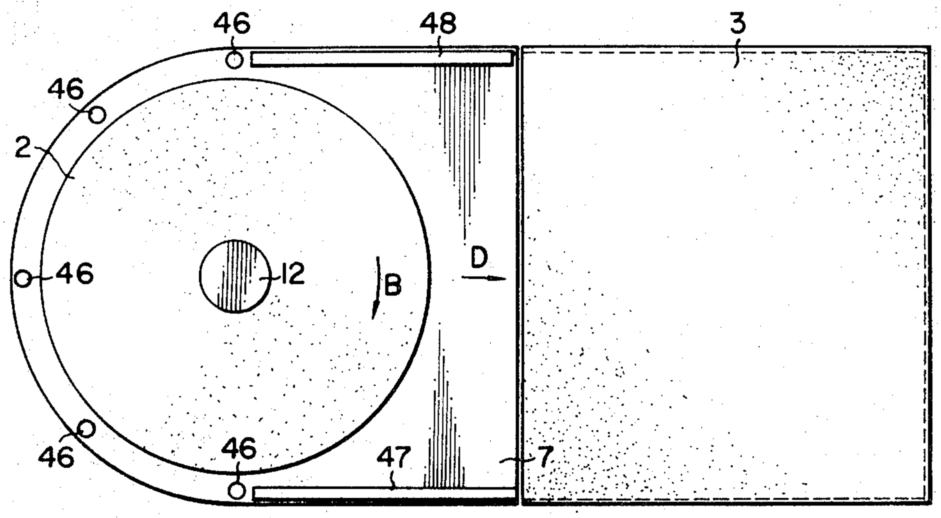

FIGS. 20 to 22 show other embodiments of this invention.

Figure 23:
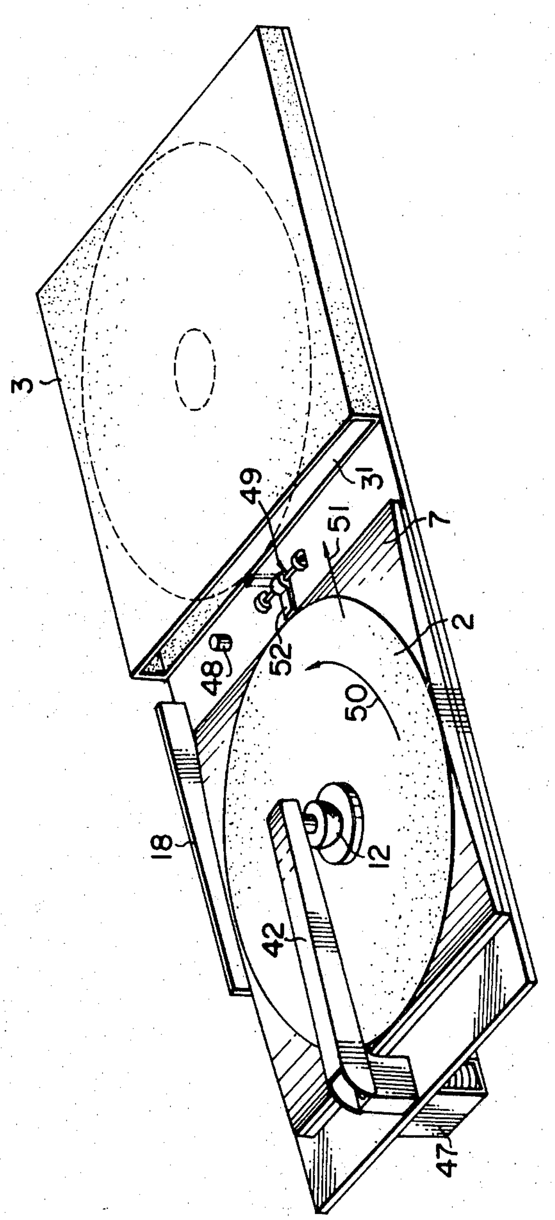

FIG. 23 shows a further embodiment of this invention.

Figure 24:
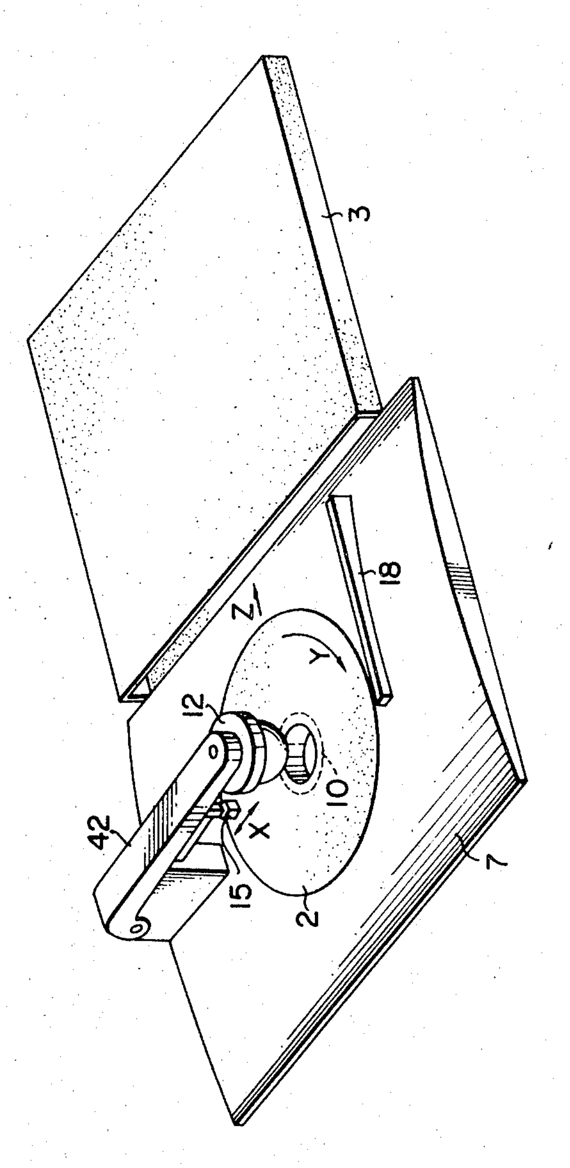

FIG. 24 shows another example of the clamp means according to this invention.

Figure 25:
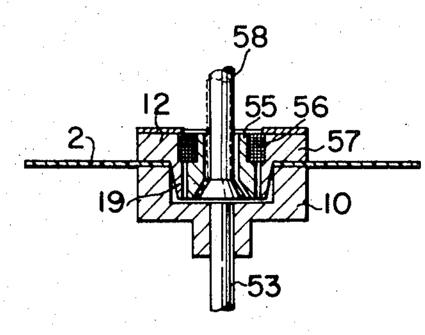
Figure 26:
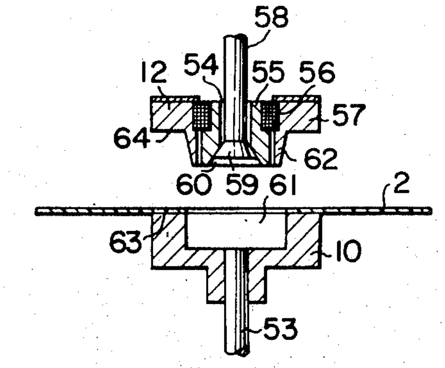

FIGS. 25 and 26 are cross-sectional views of detailed structure of the clamp means according to this invention in different states; FIG. 25 shows the state when a record disk is clamped on a turn table and FIG. 26 the state when the clamp is released.

Figure 27:
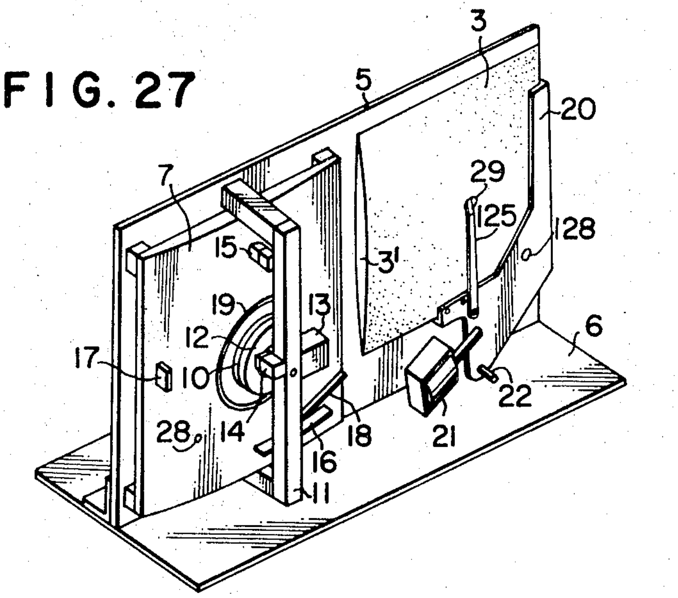

FIGS. 27 to 32 show another embodiment of this invention; FIG. 27 shows the state when a jacket is inserted and FIGS. 28 to 32 show details of the opening means in the system shown in FIG. 27.

Figure 33:
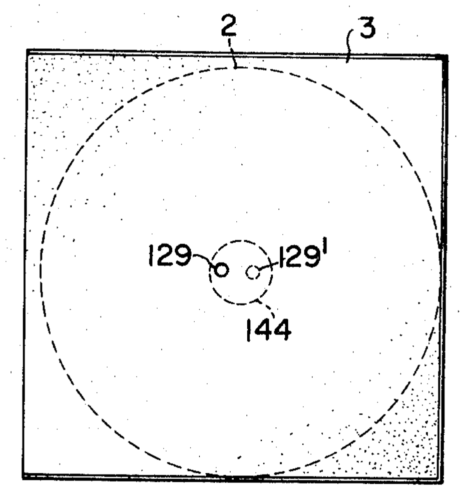
Figure 34:
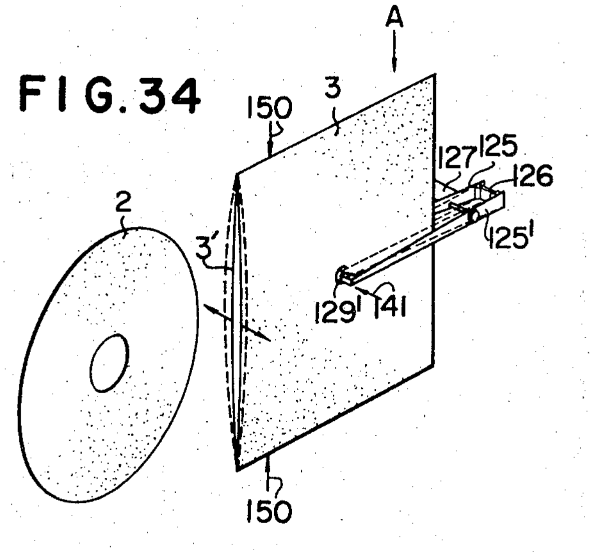
Figure 35:
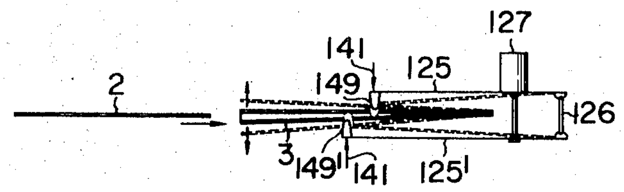

FIGS. 33 to 35 show yet further embodiment; FIG. 33 shows the state when a disk is inserted in a jacket, and FIGS. 34 and 35 show details of the main portions of the opening means.

Figure 36:
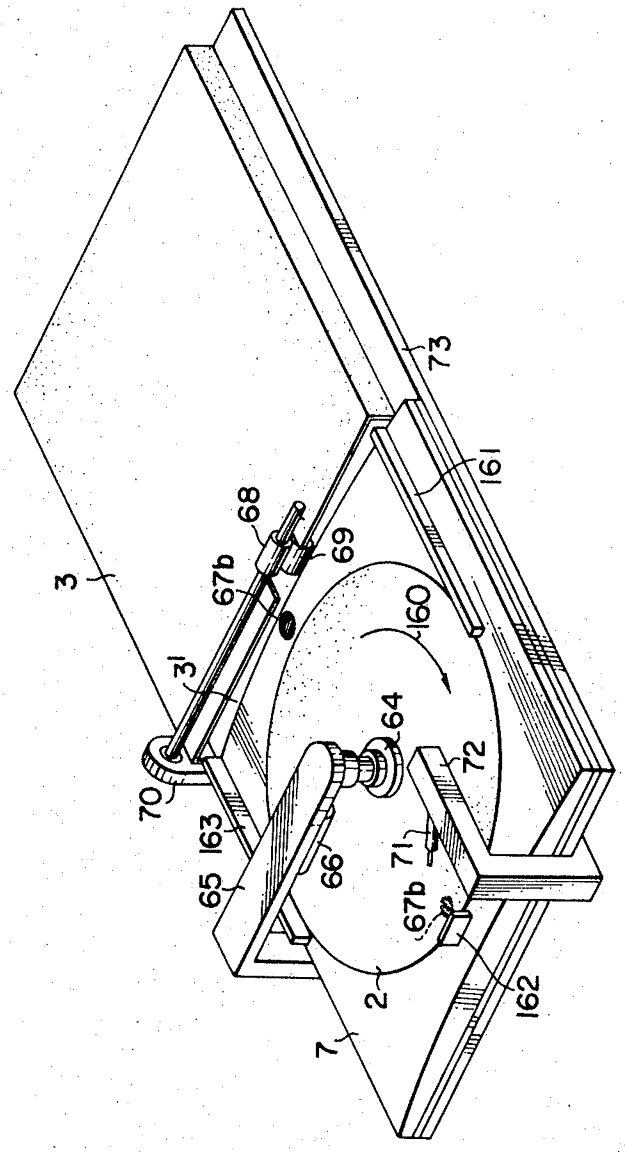

FIG. 36 shows the inner structure of another embodiment of the horizontal type according to this invention.

Figure 37:
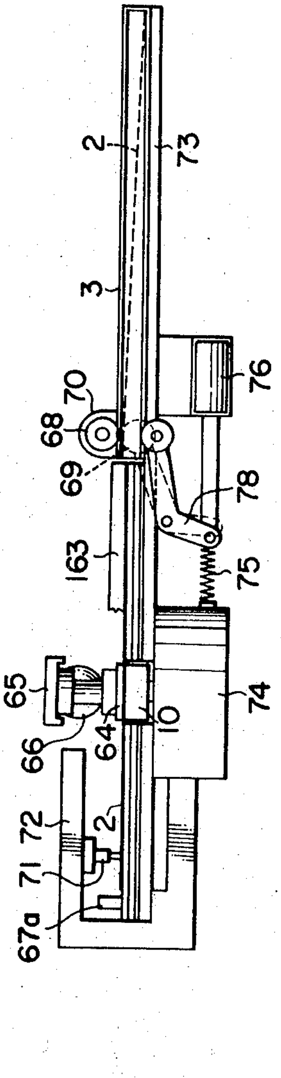

FIG. 37 is a side view of the structure of FIG. 36.

Figure 38:
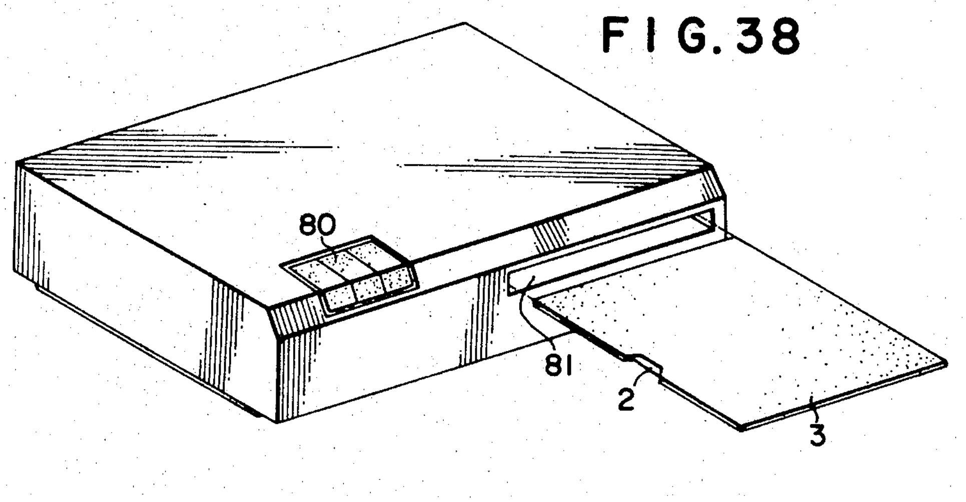

FIG. 38 is an outside view of the embodiment of FIG. 36.

Figure 39:
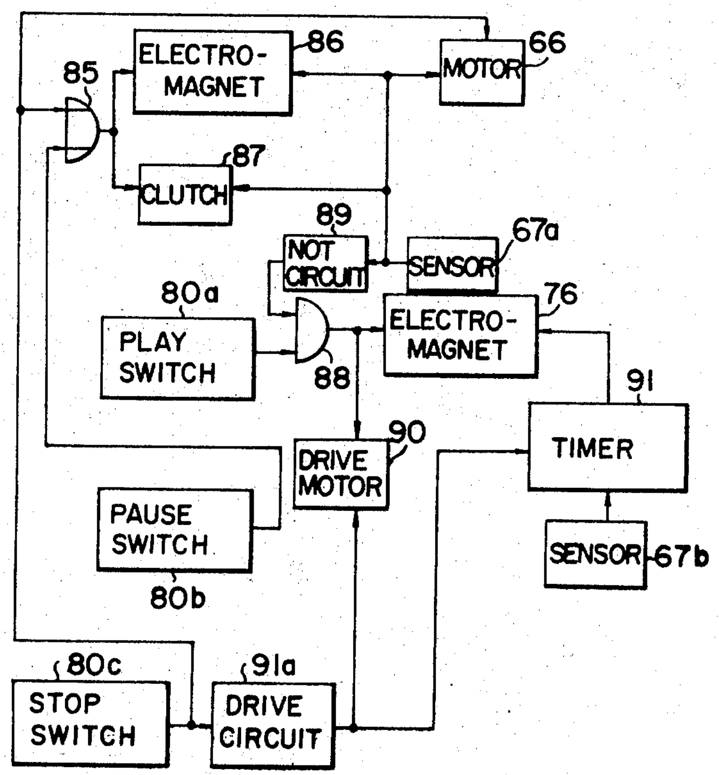

FIG. 39 is a block diagram of an operation circuit for the embodiment of FIG. 36.

In the drawings, like reference numerals refer to like parts.

Figure 1:
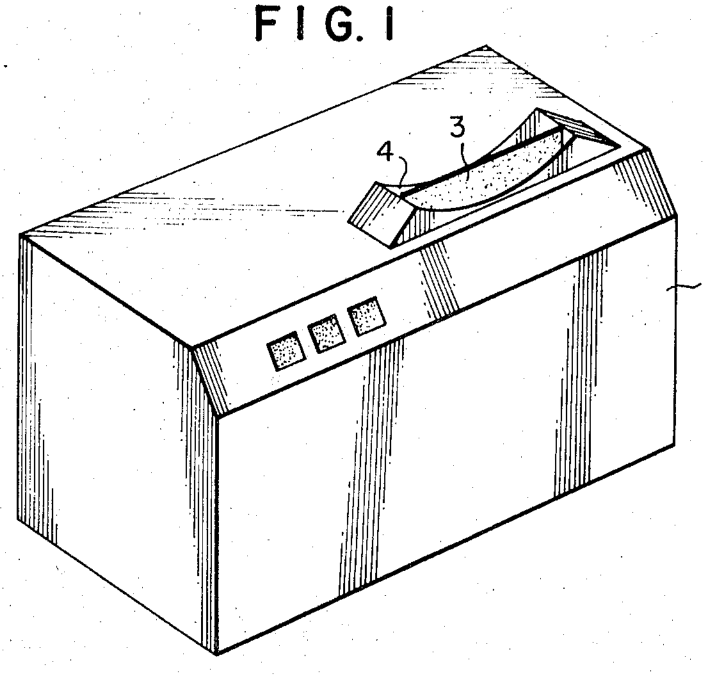
FIG. 1 is an outside view of an embodiment of the record disk loading and retrieving system according to this invention.

FIG. 1 shows the outside of the first embodiment of this invention. In the upper surface of a housing 1, an opening 4 is provided for inserting a container 3, such as a jacket or a cartridge, which contains a flexible recording medium 2 of a disk shape. The container 3 has an opening in one side for allowing a record disk 2 to go in and out as is shown in FIG. 2.

FIG. 2 is a perspective view of the main portions of the inner structure of the embodiment of FIG. 1 and FIGS. 3 to 8 show various operational states of this structure. In FIGS. 2 to 8, a side plate 5 is provided perpendicular to a bottom plate 6 and a back plate 7 is fixed to one surface of this side plate 5. The back plate is provided with a through-hole at a central portion. A turn table 10 is driven by a motor 8 through a belt 9 at a high speed. The turn table 10 is arranged to project from said back plate 7 through said through-hole to some extent. A support 11 is disposed against said back plate 7 with a certain gap therebetween. A clamp means 12 is provided on this support 11 to be movable in a direction perpendicular to said back plate 7. This clamp means 12 opposes to said turn table 10 and can press and fix a flexible record disk on the turn table 10. For moving this clamp means 12, a drive means 13 formed of a plunger, etc. is provided. A switch 14 is actuated by the movement of said clamp means 12. A signal transformer 15 can be brought into contact with the recording medium 2 to record or reproduce signal and is movable along said support 11. A guide member 16 guides the recording medium 2 released from the jacket 3 as will be described below to the turn table 10. A stopper 17 restricts the movement of the recording medium 2. Another guide member 18 guides the recording medium 2 to the jacket 3 in retrieving the recording medium and can provide a sufficient frictional force against the periphery of the recording medium 2. An annular guide member 19 is fixed to said support 11 to oppose to said turn table with a certain gap maintained from the back plate 7 and allows said clamp means 12 to penetrate therethrough. A jacket receiver 20 disposed below the opening 4 in the housing 1 supports the jacket 3, which is inserted through the opening 4, on the lower edge and on a side surface opposite to said back plate 7. The jacket receiver 20 is rotatable about an axis 22 and can be rotated by a plunger 21 on one hand, and further is movable in a direction perpendicular to the side plate 5 by a plunger 23. For opening the inserted jacket 3, there is provided an opening means 24 having a sucker, etc. at the end.

Figure 3:
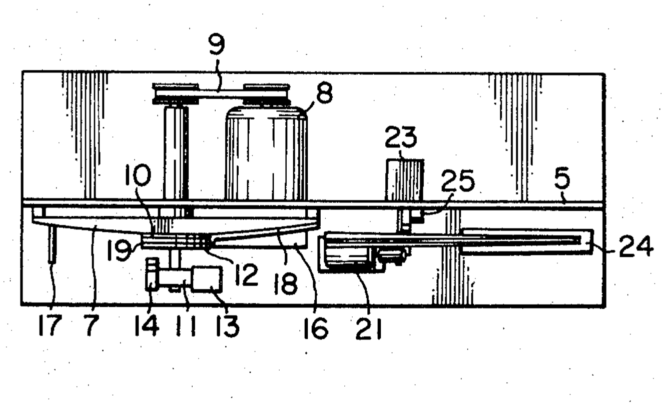
Figure 3:
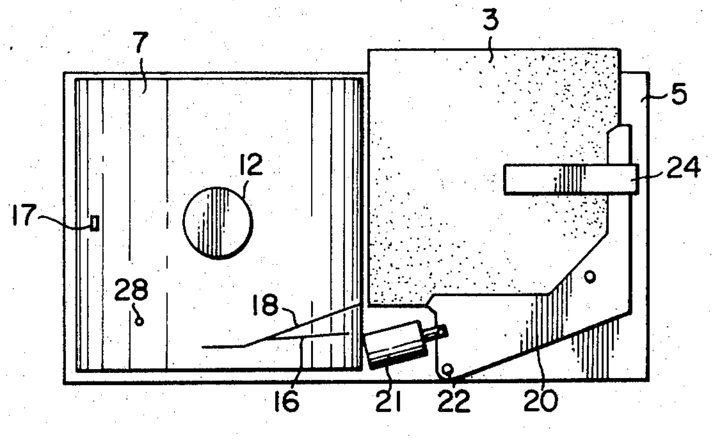
Figure 4:
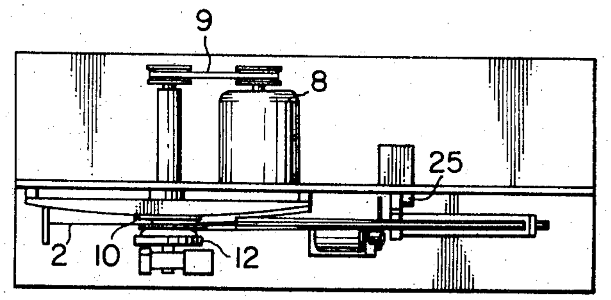
Figure 4:
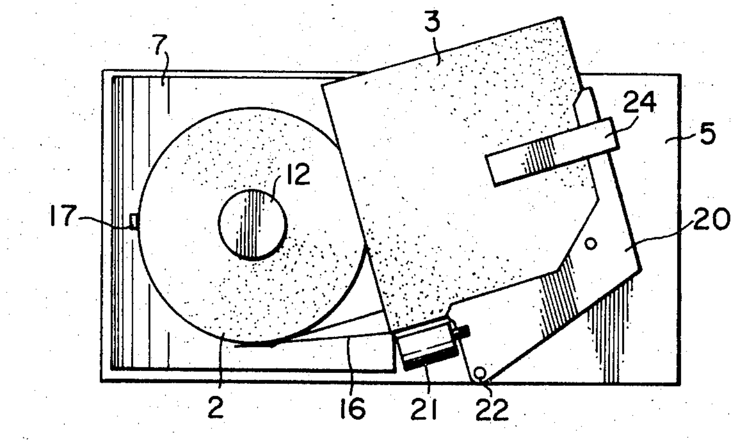
Figure 5:
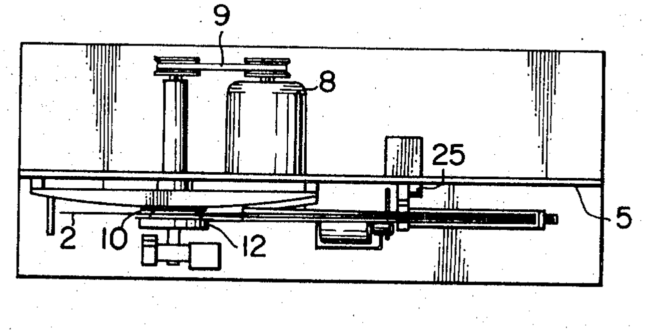
Figure 5:
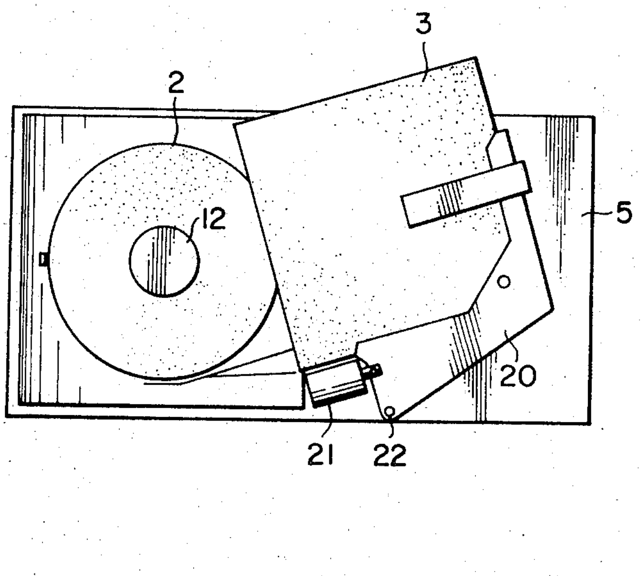
Figure 6:
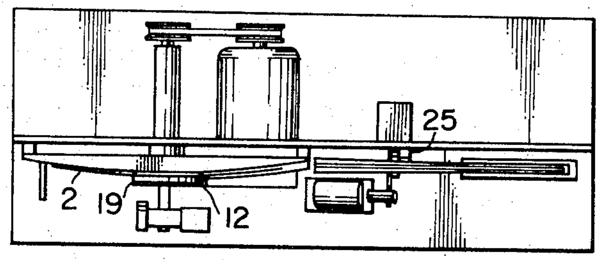
Figure 6:
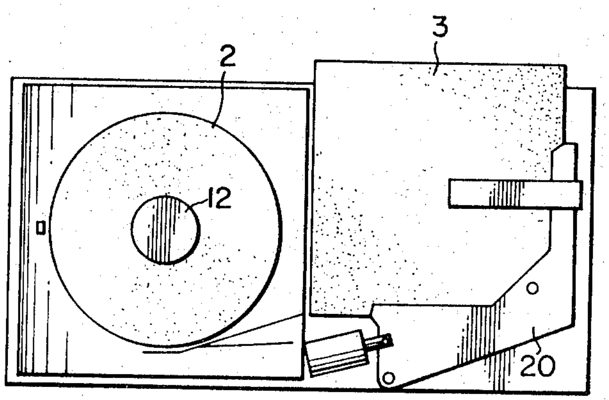

FIGS. 3 and 3' shows the state when a jacket 3 is inserted with its opening positioned on the side of the turn table 10. In this state, the clamp means 12 and the turn table 10 are engaged and the turn table 10 is rotated at a high speed by a motor 8. When an operation button 26 shown in FIG. 9 is depressed in this state, the drive means 13 is activated through a control circuit 27. Thereby, the engage between the clamp means 12 and the turn table 10 is released, and the switch 14 is activated to drive the plunger 21. In accompany with this motion of the plunger 21, the jacket receiver 20 is rotated (tilted) as is shown in FIGS. 4 and 4' to allow the record disk 2 to roll down out of the jacket 3 by its weight and move along the guide member 16 to a position restricted by the stopper 17 on the back plate 7. A sensor 28 provided on the back plate 7 detects that the recording medium 2 is positioned at the predetermined position restricted by the stopper 17, and activates the drive means 13 to depress the clamp means 12 on the turn table 10 thereby fising the record disk 2 on the turn table 10 (FIGS. 5 and 5' shows an intermediate state). At the same time, the sensor 28 stops the action of the plunger 21 and returns the jacket receiver 20 to the original position (FIGS. 6 and 6'). The top of the clamp means 12 is formed in a cone-like shape so that the record disk 2 can be fixed on the turn table 10 with the center axes registered on one line without failure even if the center axes of the two were off-set to some extent. Further, the annular guide 19 is provided to prevent the recording disk 2 from moving away from the back plate before the clamping operation. Recording or reproduction is done by the signal transformer 15, keeping the state of FIGS. 6 and 6'.

Figure 7:
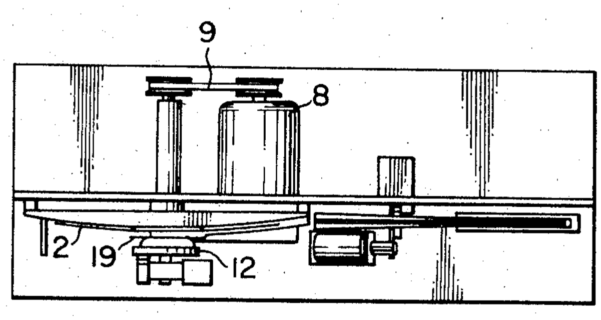
Figure 7:
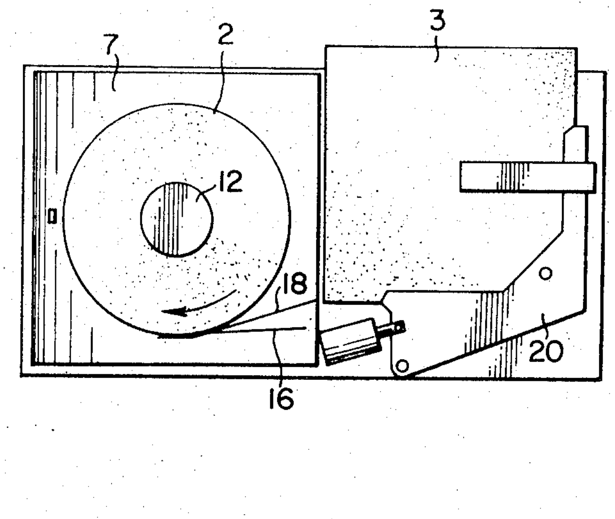
Figure 8:
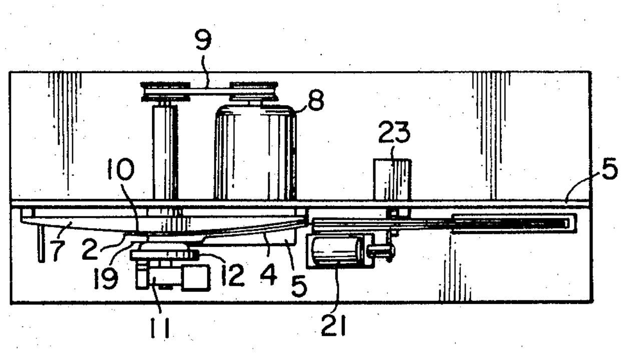
Figure 8:
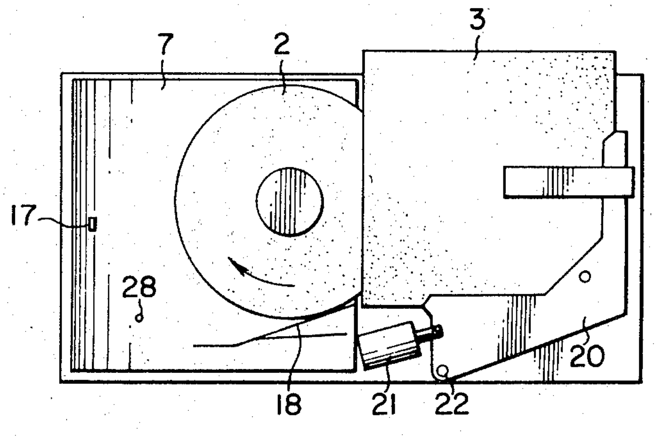

When recording or reproducing operation is ended, the plunger 21 is driven to draw the jacket receiver 20 near the side plate 5 to bring the opening of the jacket 3 adjacent one end of the guide member 18. A switch 25 detects this movement and activate the drive means 13 to release the engage between the clamp means 12 and the turn table 10. The plunger 21 is arranged not to act in this operation. When the engagement between the clamp means 12 and the turn table 10 is released, the record disk 2 falls down to allow its periphery to contact the guide member 18 as is shown in FIGS. 7 and 7'. In this state, since the record disk 2 keeps rotating, it rolls up along the guide member 18 to go into the jacket 3 as is shown FIGS. 8 and 8'.

As is described above, a record disk can be taken out of a jacket, etc. and loaded in a reproducing unit and further unloaded from the reproducing unit and retrieved back into the jacket without need for touching the record disk by hand only if the record stored in a jacket or a cartridge is merely inserted into the system. Further, since there is no need to stop the rotation of the turn table in loading or unloading a record disk, the time required for starting recording or reproduction can be reduced extremely.

FIGS. 10 to 12 show th case when the rotation plane of a record disk 2 is horizontal. In this case, since the record disk cannot fall down to touch the guide member 18 by its weight, the record disk 2 is pushed up by a pin, etc. (not shown) at a position opposite to the guide member 18 to tilt the record plate and bring it in contact with the guide member 18 in FIG. 10. Alternatively, in FIG. 11 a pin 34 pushes a record disk toward the guide member 18 and in FIG. 12 the top of the guide member 18 itself is moved toward a record disk 2 to obtain the contact between a record disk and the guide member 18.

Next, description will be made on concrete examples of the guide member 18 which is one of the main feature of this invention, referring to FIGS. 13 to 15.

In FIG. 13, a guide member 18 is formed of a resilient member having a flat upper surface of large friction factor. A guide member 18 shown in FIG. 14 is formed to have a V-shaped groove for ensuring the guide of a record disk 2 and for increasing the frictional force. A guide member 18 shown in FIG. 15iis provided with a rib 36 to prevent a record disk from escaping from the guide 18. The guide member, at least in the portion to be subjected to a sudden contact with a rotating record disk is formed of a resilient material so that the impact is absorbed in the resiliency and the periphery of the record disk prevented from damage. Further, due to the impact of a record disk a concave portion is momentarily formed in the resilient member, which increases the contact area with the record disk and hence increases the frictional force. Further, in mounting the guide member to the back plate, the resilient guide member can be easily arranged to have a curved surface. It is not necessary, however, to form the whole guide member with a resilient material, but a sufficient effect can be obtained if the neighborhood of the portion to be subjected to the initial contact with the record disk is formed of a resilient material.

Further examples of the guide member 18 is shown in FIGS. 16 and 17. In FIG. 16, the upper surface (the surface subjected to a contact with a record disk 2) of the guide member 18 forms an acute angle with the back plate 7 to form a V-shped groove 35 therewith. In FIG. 17, the guide member 18 is provided with a V-shaped groove 35 and is set to bring the edge of this groove 35 at a position separated from the surface of the back plate 7 by some distance. Here, the separation of the opposing surfaces in the top portion of the V-shaped groove is arranged to be smaller than the thickness of the record disk 2. According to these structure, when the clamp for the record disk 2 is released, the record disk 2 falls down to and engages with the V-shaped groove 35 formed of the guide member 18 and the back plate 7 or formed in the guide member 18 by its weight and produces a greater frictional force than that of the case of a flat guide member. Thus, the rotation of the record disk 2 can be effectively transformed into a thrust force carrying the record disk along the guide member. Further, the V-shaped groove also works to guide the movement of the record disk to ensure a stable operation. When the edge of the V-shaped groove 35 is separated from the extention of the back plate 7 by some distance as is the case in FIG. 17, the chance of unfavorable contacts of the record disk 2 with the back plate 7 during transport is reduced. Further, if the guide member 18 is formed of a resilient member such as rubber, it works to protect the periphery of the record disk.

FIGS. 18, 19*a* and 19*b* show another embodiment in which the relation of the clamp mechanism with the record disk is modified. A flexible record medium 2 such as a disk is set in a container 3 such as a cartridge. A clamp member 12 clamps the flexible record disk 2 on a turn table 10. The clamp member 12 is provided with a cone-shaped portion 41. Clamping operation is achieved by a support 42. A frictional member 18 works as a load for transforming the rotating motion of the flexible record disk 2 into a movement in a radial direction. The turn table 10 projects slightly from a back plate 7 so that the record disk 2 is rotated in a slightly floated position from the back plate 7. A signal transformer 15 is movable as shown by arrows 43. Arrows 44 and 45 indicate the directions of the rotation and the movement of the flexible record disk 2, respectively. The frictional member 18 also works as the guide for the flexible record disk when the record disk is to be loaded back in the cartridge 3. FIGS. 19*a* and 19*b* show the unloading operation. When the record disk 2 is clamped by the clamp member 12 and rotated, there is kept a small gap between the frictional member 18 and the flexible record disk 2. An intermediate state when the clamp is being released is shown by the dotted lines. Due to the cone-shape 41 of the clamp member 12, the effective radius of the clamp member 12 decreases and the flexible record disk 2 becomes eccentric. Further when the clamp is released, the eccentric state is maintained by the turn table 10. Thus, the eccentric flexible record disk 2 is brought into contact with the frictional member 18 and moved in the direction of the arrow 45. In this embodiment, a cone is provided to the clamp member. Similar effects can be provided if the clamp member has a tapering shape, i.e. decreasing radius, such as a semi-sphere. Further, in this embodiment, a flexible record disk is mechanically taken out from a cartridge, but the manner of such operation is not shown in the figures.

FIGS. 20 to 22 show further embodiments. In FIGS. 20 and 21, approximately at the center of a back plate 7, a turn table 10 is disposed which is rotated at a high speed by a drive source (not shown). A disk-shaped recording medium 2 is detachably supported on said turn table by a clamp member 12 at its center. A frictional member 18 is disposed on said back plate 7 in a U-shape to closely surround the approximately semi-circle of the record disk 2 mounted on the turn table 10. A record disk container 3 has an opening 3' in one side and is disposed to set the opening 3' on the extension of said frictional member 18.

Now, the operation will be described. In retrieving the disk 2 rotating in a direction shown by the arrow B in FIG. 20 into the container 3, the clamp member 12 is driven by the drive means in the A direction shown in FIG. 21 to release the engagement of the record disk 2 with the turn table 10. When this engagement is released, the rotating record disk 2 is moved in one direction by the friction with the back plate 7 or with the turn table 10. If the record disk 2 is moved in the direction of the arrow C, it contacts with the frictional member 18 disposed in this direction. Thereby, the rotation of the record disk 2 is transformed into a thrust force in a radial direction by the friction with the frictional member 18 and thus the record disk 2 is carried in the direction of the arrow-D and then stored in the container 3. When the record disk 2 is moved in the direction of the arrow-E, the rotation of the disk 2 is similarly transformed into the thrust force by the frictional member and the record disk 2 is transported along the curve of the frictional member 18, finally transported in the direction shown by the arrow-D and stored in the container.

FIG. 22 shows another embodiment, in which the frictional member 18 bent in a semi-circular shape in the embodiment of FIGS. 20 and 21 is replaced with several pins 46 disposed along the semi-circle of the disk 2 at a predetermined gap. The container 3 is disposed to bring its opening directed to the open side of the pin arrangement 46 of a semi-circular shape. Said opening and the container 3 are connected with guide means 47 and 48 to guide the record disk 2. The operation of the system is similar to that of the case of FIG. 20. Namely, in the case of FIG. 20, the frictional member 18 is continuously disposed along the semi-circle of the record disk 2, and the record disk is thrusted from the opening of the frictional member 18 of a semi-circle shape and guided to the container through a guide means unitary with said frictional member. The frictional member may be formed of several members disposed at an appropriate distance as in FIG. 22.

FIG. 23 shows yet further embodiment, in which numeral 7 is a back plate, 2 a record disk, 12 a clamp member for fixing the record disk 2 on the turn table, 42 a clamp support, 47' an electromagnet for releasing clamp, 18 a frictional and guide member for transforming the rotation of the record disk 2 into a thrust in a radial direction by contact with the outer periphery of the record disk 2 when clamp is released, 3 a container for the record disk 2 having an opening 3', 48' a sensor for detecting the pass of the record disk 2, 49 a second thrust means which rotates to the position of the broken line to push the record disk 2 in the container 3 and at the same time cover the opening 3' of the container 3 when the sensor makes a detection, 50 the rotational direction of the record disk, and 51 the direction of the record disk 2 when it is moved in a radial direction.

When the clamp member 12 is lifted by the electromagnet 47' during the rotation of the record disk 2 to release the clamp, the record disk 2 contacts the frictional member 18 on the outer periphery to transform the rotation into a thrust in the direction of the arrow 51. The rotational direction of the record disk is indicated by the arrow 50. Then when the record disk is guided by the frictional member 18 and the end edge of the record disk 2 passes over the sensor 48, the sensor 48 works to rotate the second thrust means 49 at a high speed to the position of the broken line to push the record disk 2 in the container 3 and at the same time to seal the opening 3' of the container 3 for preventing the rebound of the record disk 2. In this embodiment, the second thrust means 49 is formed by the rotation of the lever 52. This may also be achieved by projecting a wedge-shaped member from the above or below to push the record disk 2 in the container 3 utilizing the slant face of the wedge and seal the opening. Alternatively, a member disposed on the side may be projected inwards to push the record disk 2 in the container 3 and seal the opening.

According to the above structure, a sensor is provided near the opening of a container for a record disk for detecting that a record disk has been stored in a container. By the detecting function of this sensor, the record disk is further pushed in the container and a second thrust means seals the opening of the container. Therefore, even if the record disk is not stored in the container completely by some resistive force, the storing operation can be completely achieved by the following operations described above. The opening of the container is closed as soon as the record disk has been stored in the container. Therefore even if a record disk is stored at a high speed, it is prevented from recoiling and running out of the container. Thus, this invention is very effective in those systems which repeat operation continuously such as an auto-changer. As there is no need to stop the operations of the reproducing system, a perfect automation can be realized. Further, since a record disk is prevented from running out during retrieval, the retrieval of a record disk can be done at a high speed. Here, if the retrieving speed is high and a record is recoiled out of a container to some extent, the second thrust means can perfectly pushes back the record disk to finish the retrieval of the record disk.

FIG. 24 shows another embodiment of the clamp means, in which numeral 7 indicates a back plate, 10 a turn table slightly projecting from the upper surface of the back plate, 2 a record disk having a through-hole at the center, 12 a clamp member for clamping the record disk 2 on the turn table 10, the clamp member 12 being mounted at the free end of a support 42 fixed to the back plate 7, 15 a signal transformer being movable in the X direction indicated by arrows, and 18 a frictional member provided on the back plate 7 with a minute gap maintained from the record disk 2. When the clamp for the record disk 2 rotating in the direction Y indicated by an arrow is released, the record disk 2 becomes eccentric to touch the frictional member 18 so that the rotation of the disk 2 is transformed into a thrust movement along the direction shown by an arrow Z by the frictional force and the disk is automatically stored in the container 3.

Description will be made more in detail on the clamp member 12, referring to FIGS. 25 and 26 The numeral 53 designates a drive shaft for the turn table 10. The clamp member 12 consists of an inner ring member 55 having a through-hole 54 at the center and an outer ring member 57 mounted to said inner ring 55 through a bearing 56. A clamp releasing shaft 58 is movably inserted through the through-hole 54 of the inner ring 55. The release shaft 58 is mounted to the support 42 and has a diverging cone portion 59 at the lower end so that it can engage with a cone portion 60 formed in the lower portion of the through-hole 54 and move the clamp member 12 up and down. The outer ring member 57 comprises a cone-like cylinder portion 62 to be inserted in the central concave portion 61 of the turn table and a clamping portion 64 for sandwitching and clamping the record disk 2 with the projecting portion 63 of the turn table 10.

When the support 42 is lowered, the clamp member 12 is lowered thereby the cylinder portion 62 of the outer ring member 57 is guided into the concave portion 61 of the turn table 10 to fit in the concave portion 61 and the clamping portion 64 clamps the record disk 2 to the turn table 10. FIG. 25 shows the state when the record disk 2 is clamped on the turn table 10. In this state, the release shaft 58 is kept at a low position where the cone portion 59 thereof does not touch the cone portion 60 of the inner ring member 55. Thus, even if the shaft center of the release shaft 58 is off-set a little as is shown by the dotted line in FIG. 25, the shaft 58 and the inner ring 55 are prevented from the mutual contact to cause no disturbance to the rotation of the record disk 2.

FIG. 26 shows the state when the clamp is released. In this state, the release shaft 58 is engaged with the inner ring 55 at its lower cone portion 59. The rotation of the inner ring 55 is soon stopped by the friction with the shaft 58, but the outer ring 57 continues rotation for some period due to the bearing 56.

In the above embodiment, a concave portion 61 was formed in the turn table 10 and a projection for fitting into the concave 61 was formed in the clamp member 12. These can be reversed, namely a concave portion may be formed in the clamp member and a projection in the turn table. The clamp member was moved by the pivot action of the support 42. This can be also altered to slide the clamp member. Further modification is possible such as to dispense with the bearing 56.

The clamp member as described above consists of a clamping member and a clamp releasing shaft relatively inserted into the center hole of the clamping member and having a portion of larger radius than that of said center hole at a top portion. The top portion of the clamp releasing shaft engages with the clamping member at the time of releasing the clamp and when the clamp is released. In the operation of the clamp, the clamp member and the clamp releasing shaft are arranged not to contact each other. Thus even if the shaft center of the clamp releasing shaft is off-set from the rotation center of the turn table to some extent, no overload is applied to the rotation of the record disk and there is no possibility to generate noises. Further, when the clamp is to work, since there is generated a play between the clamp member and the releasing shaft, the clamping operation can be done smoothly. The clamping operation can be achieved purely mechanically and hence without stopping the rotation of the turn table, and thereby the exchange of the record disk becomes rapid. Further, if the clamp member is formed of an inner ring and an outer ring and the two are coupled rotatively, the outer ring keeps rotating lightly when the clamp is released and hence the application and release of the clamp can be done swiftly. Here, stand-up operation of the record disk is also improved. Further there are provided such advantages that high precision is not needed for setting the clamping member with respect to the center of the turn table and the assembly becomes easy.

FIGS. 27 to 35 show further embodiments of this invention, in which the opening means in the first embodiment shown in FIGS. 1 to 9 is altered. Jacket opening members 125 and 125' are connected near one end with a support member 126 as the support point to be detachably rotative as is clearly shown in FIGS. 28 to 32. The top ends of the opening members 125 and 125' can be brought into contact or out of contact in dependence upon the drive by a plunger 127. One of the jacket opening members 125' is fixed to the jacket receiver 20 with the top end directed to the direction of the jacket insertion. Here, the top ends of the jacket opening members 125 and 125' are staggered a little as is shown in FIG. 32.

Then, the operation will be described. FIG. 27 shows the state when a jacket 3 is inserted. The opening 3' of the jacket 3 is arranged to locate on the turn table 10 side. Here, the clamp member 12 and the turn table 10 are engaged and the turn table 10 is rotated at a high speed by a motor 8. When the jacket 3 is inserted, the jacket opening members 125 and 125' are in the state as shown in FIG. 29 in which the top ends are opened and the jacket 3 is inserted between these opening members 125 and 125'. When the jacket 3 is inserted to an intermediate position, a detector 128 detects the inserted state and drive the plunger 127 to pinch the jacket 3 with the opening members 125 and 125'. As the jacket 3 is further inserted in this state, the top end of the opening members 125 and 125' are inserted into the through-holes 129 and 129' formed in a central portion of the jacket 3 (see FIG. 30). After the jacket 3 is perfectly inserted, a play operation switch may be depressed. Then, the plunger 127 is activated to open the members 125 and 125' to thereby open the opening 3' of the jacket 3 widely (see FIG. 31). Further, the drive means 13 is activated to release the engagement between the clamp means 12 and the turn table 10. When this engagement is released, the switch 14 is activated to actuate the plunger 21. In accompany with this action, the jacket receiver 20 is rotated about the support 22 to allow the record disk 2 in the jacket 3 to roll down from the jacket 3 along the guide member 18 to a position restricted by the stopper 17 fixed to the back plate 7 as is shown in FIG. 4.

FIGS. 33 to 35 show another embodiment. FIG. 33 shows the state where a record disk 2 is inserted in a jacket 3 in which slightly staggered holes 129 and 129' are provided near the center of the front and back sheet of the jacket 3. The holes 129 and 129' are arranged to locate at such positions which at least overlap the center hole 144 of the record disk 2. FIGS. 34 and 35 show the main portions of the opening means in which jacket opening members 125 and 125' are pivotally connected at one end by a support 126 and can be moved in the direction of an arrow 141, i.e. the direction to bring the ends of the members 125 and 125' nearer by a plunger 127.

Operation will be described hereinbelow. When a jacket 3 is inserted, the top ends of the members 125 and 125' are in a separated state and the jacket 3 is inserted from the direction of an arrow A between the opening members 125 and 125'. The jacket 3 is supported by a receiver (not shown), such as said jacket receiver 20, at a predetermined position in a state as shown in FIG. 27. If the plunger 127 is activated in this state, the gap between the opening members 125 and 125' is decreased and the projections 149 and 149' provided at the ends of the opening members 125 and 125' are respectively inserted into the holes 129 and 129'. The projections 149 and 149' inserted in such a manner penetrate through the center hole 144 of the disk 2 contained inside and push the jacket 3 from the inside to thereby open the opening 3' of the jacket 3 as is shown by the dotted lines in FIGS. 34 and 35. When the jacket 3 having been opened as is described above is depressed by a depressing means (not shown) in the direction shown by an arrow 150 in FIG. 34, the jacket is supported with the aperture 3' opened or further opened. The plunger 27 stops its operation in this state and the opening members 125 and 125' are released from the holes 129 and 129' of the jacket 3. Then, it is easy to take out the disk from the opened jacket 3; by tilting the jacket 3 or giving vibration to the jacket 3.

In replacing the disk 2 into the jacket, the record disk 2 can be replaced into the jacket 3 through the opening 3' by a method as described before.

According to this embodiment as described above, there are formed no cut-aways in the opening portion but holes in the central portion, therefore the strength of the jacket is not weakened. Further, since the jacket is to be opened from the central portion, it can be opened stably from deep inside.

FIG. 36 shows the inner structure of another embodiment of the horizontal type, in which numeral 2 indicates a record disk having a center hole for turning the disk, 160 an arrow representing the rotational direction of the record disk 2 in this embodiment, 7 a stabilizing plate above which the record disk 2 is rotated with a predetermined distance of floatation 161, 162 and 163 guide members in which 162 and 163 are simply guide members and 161 a guide member working as a frictional means which applies a load to damp the rotation of the record disk 2, 64 a clamp member for fixing the record disk 2 on a turn table 10 (cf. FIG. 37), 65 a support for the clamp member 64 provided with a motor 66 for moving up and down the clamp member **64, 67*a* and 67*b* sensors for sensing the record disk 2, the sensor 67*a* detecting that the record disk 2 is located at a predetermined position in the stabilizing plate 7, i.e. at a position where the record disk 2 can be clamped by the clamp member 64 on the turn table 10 (cf. FIG. 37), the sensor 67*b* detecting that the record disk 2 is completely stored in the jacket 3, more particularly being insensitive when the record disk 2 is perfectly at predetermined positions but sensitive when it is at an intermediate state between the state to be clamped by the clamp member and the perfectly retrieved state, and 3 a container having an opening 3' for allowing the record disk to go in and out of the container 3 and cut-away portions near the center of the opening 3'. A pair of rollers 68 and 69 is provided at the cut-away portions for taking out the record disk 2 from the container 3. In this embodiment, the lower roller 69 is arranged to be movable in the vertical direction. The upper roller 68 is a drive roller driven forward and backward by a drive mechanism 70. A pick-up 71 reproduces the recorded signals in the record disk 2. A pick-up feed mechanism is provided in the arm 72. Numeral 73** represents the substrate.

FIG. 37 shows a side view of this invention, in which the record disk 2 is fixed by the clamp member 64 on the turn table 10 and rotated. The turn table 10 is rotated by a drive motor 74. The up-and-down motion of the roller 69 is made by moving an arm 78 through a tension spring 75 and an electromagnet 76. Namely, when the electromagnet 76 is energized the roller 69 is lifted up. Here, if the roller 68 rotates rightward, the record disk 2 is taken out on the stabilizing plate 7. If the roller 68 is rotated leftward, it prevents the record disk 2 from running out of the container 3.

FIG. 38 is an outside view of this embodiment. Operation buttons 80 and an aperture 81 for loading a container 3 are provided in the outer housing. It is assumed here that the opening of the container 3 should be directed left side.

FIG. 39 is a block diagram of the operation circuit in this embodiment, in which numeral 80*a* indicates a play switch, 80*b* a pause switch, 80*c* a stop switch and 85 an OR circuit. The OR circuit is activated when either of the stop switch 80*c* and the pause switch 80*b* is depressed and cuts off an electromagnet 86 for lowering the pick-up 71 thereby to lift the pick-up and at the same time disconnect the clutch 87 for feeding the pick-up 71 thereby to stop the feed of the pick-up 71. In reproduction, when the sensor 67*a* is activated by detecting a record disk 2, the electromagnet 86 is energized to lower the pick-up 71 so as to bring it in contact with the record disk 2. Further, the clutch 87 for feeding the pick-up 71 is connected to feed the pick-up and reproduction begins. When there is no record disk loaded, the sensor 67*a* cannot be activated and hence the pick-up 71 is neither lowered nor fed. When the sensor 67*a* is activated, the motor 66 for moving up and down the clamp member 64 is energized to lower the clamp member 64 to fix the record disk 2 on the turn table 10. An AND circuit 88 provides an output when both of a NOT circuit 89 and the play switch 80*a* provide outputs. The NOT circuit 89 generates an output when the sensor 67*a* does not detect the record disk 2 and no output when the sensor 67*a* detects the record disk 2. When the AND circuit 88 provides an output, i.e. when the record disk 2 is not located at a predetermined position and the play switch 80*a* is depressed, an electromagnet 76 is energized to drive the roller 69 upwards and pinch the record disk 2 contained in the container 3 with the roller 68. At the same time, the drive motor 90, and hence the roller 68 is rotated in the direction for drawing out the record disk from the container 3. The electromagnet 76 and the drive motor 90 are actuated until the record disk 2 is drawn out by the rollers 68 and 69 to a predetermined position on the stabilizing plate 7 and the sensor 67*a* is activated.

A timer 91 is activated by the stop switch 80*c* and works for a certain period. Namely, when the stop switch 80*c* is put in, the drive motor 90 is reversely rotated for a certain period to retrieve the record disk 2 into the container 3. When the sensor 67*b* detects that the record disk 2 has passed along, it actuates a drive circuit 91*a* which energizes the electromagnet 76 to lift the roller 69. Here, the sensor 67*b* can be replaced with a circuit, such as a timer, which is activated when a certain period has passed.

What we claim is:

1. A record disk loading and retrieving system comprising:

a record disk;

a record disk container having an opening on one side for allowing said record disk to go in and out;

a turn table for engaging with and rotating said record disk;

means for taking said record disk out of said record disk container and transporting the disk onto said turn table;

clamp means for detachably engaging said record disk with said turn table;

means for contacting the periphery of said record disk rotating on the turn table and applying a damping load for the rotation when said clamp means is released; and guide means for guiding the record disk to the opening of said record disk container utilizing the thrust force generated by the rotation of said record disk subjected to said load means.

2. A record disk loading and retrieving system according to claim 1, in which said record disk transporting means supports said record disk container above the position for clamping the record disk and tilts said disk container in drawing out the record disk to let the record disk fall down by its weight.

3. A record disk loading and retrieving system according to claim 1, wherein said container is provided with a cut away portion near said opening, and in which said record disk transporting means includes two rollers to be inserted in said cut away portion and pinch the record disk in the container, at least one of the rollers being driven to rotate.

4. A record disk loading and retrieving system according to claim 1, further comprising means for detecting that the record disk is retrieved in the disk container; and second transporting means for pushing said record disk into the disk container by the output of said detecting means.

5. A record disk loading and retrieving system according to claim 1, further comprising means for contacting the record disk rotating on the turn table when the clamp means is released and shifting the record disk to said load means.

6. A record disk loading and retrieving system according to claim 1, in which said load means having the portion subjected to contact with the record disk formed in a V-shaped groove.

7. A record disk loading and retrieving system according to claim 1, in which said guide means is disposed in U-shape along the outer periphery of the record disk on the turn table.

8. A record disk loading and retrieving system according to claim 1, in which said clamp means consists of a smooth tapering projection and a concave portion formed in said turntable to engage with said projection.

9. A record disk loading and retrieving system according to claim 1, in which said clamp means comprises a concave formed in said turn table, an outer ring member having a projection to fit in said concave, and a clamp releasing shaft for rotatively supporting said outer ring member.

10. A record disk loading and retrieving system according to claim 1, in which said disk container is provided with holes, and said record disk further comprises an opener means for extending the opening of said disk container by engaging with the holes of said disk container.

* * * * *